US010410304B2

(12) United States Patent
Rajagopalan et al.

(10) Patent No.: US 10,410,304 B2
(45) Date of Patent: Sep. 10, 2019

(54) PROVISIONING IN DIGITAL ASSET MANAGEMENT

(71) Applicant: Microsoft Technology Licensing, LLC, Redmond, WA (US)

(72) Inventors: Rajmohan Rajagopalan, Sammamish, WA (US); Michael Stokes, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 870 days.

(21) Appl. No.: 14/721,079

(22) Filed: May 26, 2015

(65) Prior Publication Data
US 2016/0260187 A1   Sep. 8, 2016

Related U.S. Application Data

(60) Provisional application No. 62/128,883, filed on Mar. 5, 2015.

(51) Int. Cl.
*G06F 16/00*   (2019.01)
*G06Q 50/18*   (2012.01)
(Continued)

(52) U.S. Cl.
CPC ......... *G06Q 50/186* (2013.01); *G06F 16/285* (2019.01); *G06Q 10/10* (2013.01); *G06Q 40/06* (2013.01); *G06Q 50/01* (2013.01)

(58) Field of Classification Search
None
See application file for complete search history.

(56) References Cited

U.S. PATENT DOCUMENTS 6,430,542 B1 * 8/2002 Moran ................ G06Q 30/02
705/35
6,970,836 B1   11/2005 Paltenghe et al.
(Continued)

FOREIGN PATENT DOCUMENTS

| JP | 2008234341 A | 10/2008 |
| WO | 2005119992 A1 | 12/2005 |
| WO | 2013170374 A1 | 11/2013 |

OTHER PUBLICATIONS

"International Preliminary Report on Patentability Issued in PCT Application No. PCT/US2016/020151", dated May 24, 2017, 8 Pages.
(Continued)

*Primary Examiner* — Anhtai V Tran
(74) *Attorney, Agent, or Firm* — Michael Best & Friedrich LLP (57) ABSTRACT

Provisioning of digital asset management is provided. A service such as a management service retrieves digital assets from external resources in response to a search of the external resources. The digital assets are classified to asset categories, which are used to match the digital assets to suggested actions to dispose of the digital assets in case of an incapacitation of the asset owner. The digital assets, the asset categories, suggested trigger events, or the suggested actions are transmitted to an asset manager to prompt the asset manager customize the digital assets, the asset categories, suggested trigger events, or the suggested actions. A workflow is created from the digital assets, the asset categories, the suggested trigger events, and the suggested actions to dispose of the digital assets in case of the incapacitation of the asset owner.

20 Claims, 7 Drawing Sheets

(51) Int. Cl.
G06F 16/28 (2019.01)
G06Q 40/06 (2012.01)
G06Q 10/10 (2012.01)
G06Q 50/00 (2012.01)

(56) References Cited

U.S. PATENT DOCUMENTS

| | | | |
|---|---|---|---|
| 7,716,732 | B2 | 5/2010 | Dodson et al. |
| 8,396,838 | B2 | 3/2013 | Brockway et al. |
| 8,538,966 | B2 | 9/2013 | Reese et al. |
| 9,286,316 | B2 | 3/2016 | Faitelson et al. |
| 9,298,927 | B2 | 3/2016 | Lietz et al. |
| 9,584,314 | B2 | 2/2017 | Bajekal et al. |
| 9,805,050 | B2 | 10/2017 | Smith et al. |
| 10,007,714 | B2 | 6/2018 | Rajagopalan et al. |
| 2002/0111946 | A1 | 8/2002 | Fallon |
| 2003/0182290 | A1* | 9/2003 | Parker ............... G06Q 40/02 |
| 2006/0218148 | A1* | 9/2006 | Weber ............ G06F 17/3002 |
| 2007/0192114 | A1 | 8/2007 | Parpala |
| 2010/0063908 | A1* | 3/2010 | Racanelli ......... G06Q 50/186 |
| | | | 705/31 |
| 2010/0180349 | A1 | 7/2010 | Koohgoli et al. |
| 2012/0016803 | A1 | 1/2012 | Tharp |
| 2012/0047055 | A1 | 2/2012 | Aiello |
| 2013/0031176 | A1 | 1/2013 | Shih et al. |
| 2013/0054780 | A1 | 2/2013 | Bade et al. |
| 2013/0110922 | A1 | 5/2013 | Shih et al. |
| 2013/0144960 | A1 | 6/2013 | Salamat |
| 2013/0238893 | A1 | 9/2013 | Henderson |
| 2013/0262514 | A1 | 10/2013 | Everett et al. |
| 2013/0325976 | A1 | 12/2013 | Mansfield et al. |
| 2014/0025591 | A1 | 1/2014 | Villa, III |
| 2014/0136591 | A1 | 5/2014 | Haberman |
| 2014/0136619 | A1 | 5/2014 | Hoberman |
| 2014/0143106 | A1 | 5/2014 | Fox |
| 2014/0181928 | A1 | 6/2014 | Bergman et al. |
| 2014/0279079 | A1* | 9/2014 | Gudorf ............... G06F 17/00 |
| | | | 705/14.73 |
| 2015/0242814 | A1* | 8/2015 | Saad ................ G06Q 10/107 |
| | | | 705/312 |
| 2015/0304343 | A1 | 10/2015 | Cabrera et al. |
| 2016/0125068 | A1 | 5/2016 | Dongieux |
| 2016/0182240 | A1* | 6/2016 | Nayshtut ............ H04L 9/3268 |
| | | | 713/158 |
| 2016/0259835 | A1 | 9/2016 | Rajagopalan et al. |
| 2016/0261635 | A1 | 9/2016 | Rajagopalan et al. |
| 2016/0261682 | A1 | 9/2016 | Rajagopalan et al. |

OTHER PUBLICATIONS

"Second Written Opinion Issued in PCT Application No. PCT/US2016/020151", dated Jan. 31, 2017, 7 Pages.
Rosen, Rebecca J., "Google Death: A Tool to Take Care of Your Gmail When You're Gone", Published on: Apr. 12, 2013 Available at: http://www.theatlantic.com/technology/archive/2013/04/google-death-a-tool-to-take-care-of-your-gmail-when-youre-gone/274934/.
Desmarais, Christina., "Manage What Happens to Your Online Accounts After You Die", Published on: Aug. 25, 2014 Available at: http://www.techlicious.com/how-to/how-to-manage-your-online-accounts-after-you-die/.
Callison-Burch, et al., "Adding a Legacy Contact", Published on: Feb. 12, 2015 Available at: https://newsroom.fb.com/news/2015/02/adding-a-legacy-contact/.
Swallow, Erica., "7 Resources for Handling Digital Life after Death", Published on: Oct. 11, 2010 Available at: http://mashable.com/2010/10/11/social-media-after-death/.
"Handling Your Digital Presence after Death", Retrieved on: Apr. 17, 2015 Available at: http://www.jardinefuneralhome.com/mysendoff/story/handling-your-digital-presence-after-death.
Romero, Ric., "Social Media, Digital Presence after Death", Published on: Aug. 28, 2013 Available at: http://abc7.com/archive/9221031/.

Kishore, Aseem., "OTT Guide to Securing Your Digital Life after Death", Published on: Jan. 30, 2014 Available at: http://www.online-tech-tips.com/computer-tips/ott-guide-securing-digital-life-death/.
"International Search Report and Written Opinion Issued in PCT Application No. PCT/US2016/020151", dated May 24, 2016, 12 Pages.
"How to Protect Your Digital Footprint", Retrieved from: https://web.archive.org/web/20160103190959/https://www.planneddeparture.com/news/How-to-protect-your-digital-footprint, Retrieved date: Mar. 17, 2015, 2 Pages.
"PasswordBox", Retrieved from: https://web.archive.org/web/20140702005559/https://www.passwordbox.com/legacylocker, Feb., 2014, 2 Pages.
Tuerk, Andreas, "Plan Your Digital Afterlife with Inactive Account Manager", Retrieved from: https://publicpolicy.googleblog.com/2013/04/plan-your-digital-afterlife-with.html, Apr. 11, 2013, 17 Pages.
"Planned Departure", Retrieved From: https://web.archive.org/web/20150721071219/https://www.planneddeparture.com/how, Retrieved Date: Apr. 17, 2015, 2 Pages.
"Principled Heart", Retrieved from: https://web.archive.org/web/20131127161525/http://www.principledheart.com/how-it-works/, Sep. 26, 2013, 3 Pages.
"The Deathswitch", Retrieved from: https://web.archive.org/web/20150320060928/http://deathswitch.com/, Retrieved Date: Apr. 17, 2015, 4 Pages.
"The Digital Beyond", Retrieved from: http://www.thedigitalbeyond.com/online-services-list/ , Feb. 3, 2015, 14 Pages.
"Non Final Office Action Issued in U.S. Appl. No. 14/722,250", dated Aug. 9, 2017, 18 Pages.
"Final Office Action Issued in U.S. Appl. No. 14/723,104", dated Jun. 1, 2018, 29 Pages.
"Final Office Action Issued in U.S. Appl. No. 14/723,104", dated Mar. 15, 2017, 26 Pages.
"Non Final Office Action Issued in U.S. Appl. No. 14/723,104", dated Jul. 7, 2017, 17 Pages.
"Non Final Office Action Issued in U.S. Appl. No. 14/723,104", dated Dec. 11, 2017, 31 Pages.
"Non Final Office Action Issued in U.S. Appl. No. 14/723,104", dated Dec. 5, 2016, 30 Pages.
"Final Office Action Issued in U.S. Appl. No. 14/723,160", dated Mar. 2, 2018, 27 Pages.
"Non Final Office Action Issued in U.S. Appl. No. 14/723,160", dated Aug. 29, 2017, 36 Pages.
"Office Action Issued in European Patent Application No. 16709236.0", dated Oct. 2, 2018, 11 Pages.
"Provisional Application Filed in U.S. Appl. No. 62/128,883", dated Mar. 5, 2015, 28 Pages.
Carroll, Evan, "How to Manage your Digital Assets", Retrieved from: https://web.archive.org/ web/20141023061431/https://www.passare.com/sites/default/files/How-to%20Manage%20Your%20Digital%20Assets.pdf, Retrieved Date: Mar. 17, 2015, 16 Pages.
Genders, Rod, "The Digital Museum", Retrieved from: https://www.step.org/journal/step-journal-december-2013-January-2014/digital-museum, Dec. 2013, 4 Pages.
Kumar, Arun, "Digital Assets Management: What Happens to Your Online Accounts After You Die", Retrieved from: https://www.thewindowsclub.com/digital-assets-management, Apr. 4, 2014, 6 Pages.
Kutler, Noam, "Protecting Your Online You: A New Approach to Handling Your Online Persona After Death", In Proceedings of Berkeley Technology Law Journal, vol. 26, Issue 4, Sep. 2011, 1 Page.
Laise, Eleanor, "Kiplinger", Retrieved from: https://www.kiplinger.com/article/retirement/T021-C000-S004-protect-digital-assets-after-your-death.html, May 2013, 4 Pages.
"International Preliminary Report on Patentability Issued in PCT Application No. PCT/US2016/020145", dated May 24, 2017, 8 Pages.
"International Search Report and Written Opinion Issued in PCT Application No. PCT/US2016/020145", dated Jun. 9, 2016, 12 Pages.
"Second Written Opinion Received for PCT Application No. PCT/US2016/020145", dated Jan. 31, 2017, 7 Pages.

(56) References Cited

OTHER PUBLICATIONS

"International Preliminary Report on Patentability Issued in PCT Application No. PCT/US2016/020305", dated May 24, 2017, 8 Pages.
"International Search Report and Written Opinion Issued in PCT Application No. PCT/US2016/020305", dated May 20, 2016, 12 Pages.
"Second Written Opinion Issued in PCT Application No. PCT/US2016/020305", dated Jan. 31, 2017, 7 pages.
"International Preliminary Report on Patentability Issued in PCT Application No. PCT/US2016/020306", dated May 24, 2017, 8 Pages.
"International Search Report and Written Opinion Issued in PCT Application No. PCT/US2016/020306", dated May 24, 2016, 12 Pages.
"Second Written Opinion Issued in PCT Application No. PCT/US2016/020306", dated Jan. 31, 2017, 7 Pages.
Redrup, Yolanda, "Death, Data and the Internet: Managing your Assets in the Digital Sphere", In Proceedings of Private Media, Oct. 15, 2013, 3 Pages.
Swallow, Erica, "7 Resources for Handling Digital Life After Death", Retrieved from: https://mashable.com/2010/10/11/social-media-after-death/#VLcrC5ZinGqo, Oct. 11, 2010, 14 Pages.
"Non Final Office Action Issued in U.S. Appl. No. 14/723,160", dated Nov. 7, 2018, 30 Pages.

\* cited by examiner

PROVISIONING IN DIGITAL ASSET MANAGEMENT

CROSS-REFERENCE TO RELATED APPLICATION

This Application claims priority under 35 U.S.C. § 119(e) to U.S. Provisional Patent Application Ser. No. 62/128,883 filed on Mar. 5, 2015. The disclosure of the U.S. Provisional Patent Application is hereby incorporated by reference in its entirety.

BACKGROUND

The proliferation of computerized automation of processes in every aspect of life, data storage and processing have become a major component of networked systems handling social interactions. In such systems, social data is entered, modified, or deleted from a number of sources. Various social data stores from simple tables to complicated databases are maintained and synchronized as new entries or modifications are made by different sources. In addition, variety of services are offered to enable internal and external parties' interactivity with the social data hosted by the data stores. Incapacitation events associated with an owner of the social data present significant challenges in management and disposition of the social data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to provisioning digital asset management. In some example embodiments, a management service may search external resources to discover digital assets of an asset owner. The management service may classify the digital assets in asset categories. The digital assets and the asset categories may be matched to suggested actions. The suggested actions may include operations to dispose of the digital assets in response to a detection of a trigger event that indicates an incapacitation of the asset owner. The digital assets, the asset categories, suggested trigger events, and the suggested actions may be transmitted to an asset manager to prompt the asset manager to customize the digital assets, the asset categories, the suggested trigger events, or the suggested actions. A workflow may be created to dispose of the digital assets based on a customization provided by the asset manager. The customization may include a selection or a modification of the digital assets, the asset categories, the suggested trigger events, or the suggested actions.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, digital asset management may be provisioned by a management service. Digital assets of an asset owner may be retrieved from external resources in response to a search of the external resources. The digital assets may be classified to asset categories which may be used to match the digital assets to suggested actions that are used dispose of the digital assets in case of an incapacitation of the asset owner. The digital assets may be transmitted to an asset manager to prompt the asset manager to customize the digital assets, the asset categories, suggested trigger events, or the suggested actions. A workflow may be created from the digital assets, the asset categories, the suggested trigger events, and the suggested actions to dispose of the digital assets in case of the incapacitation of the asset owner.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provision digital asset management. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1:
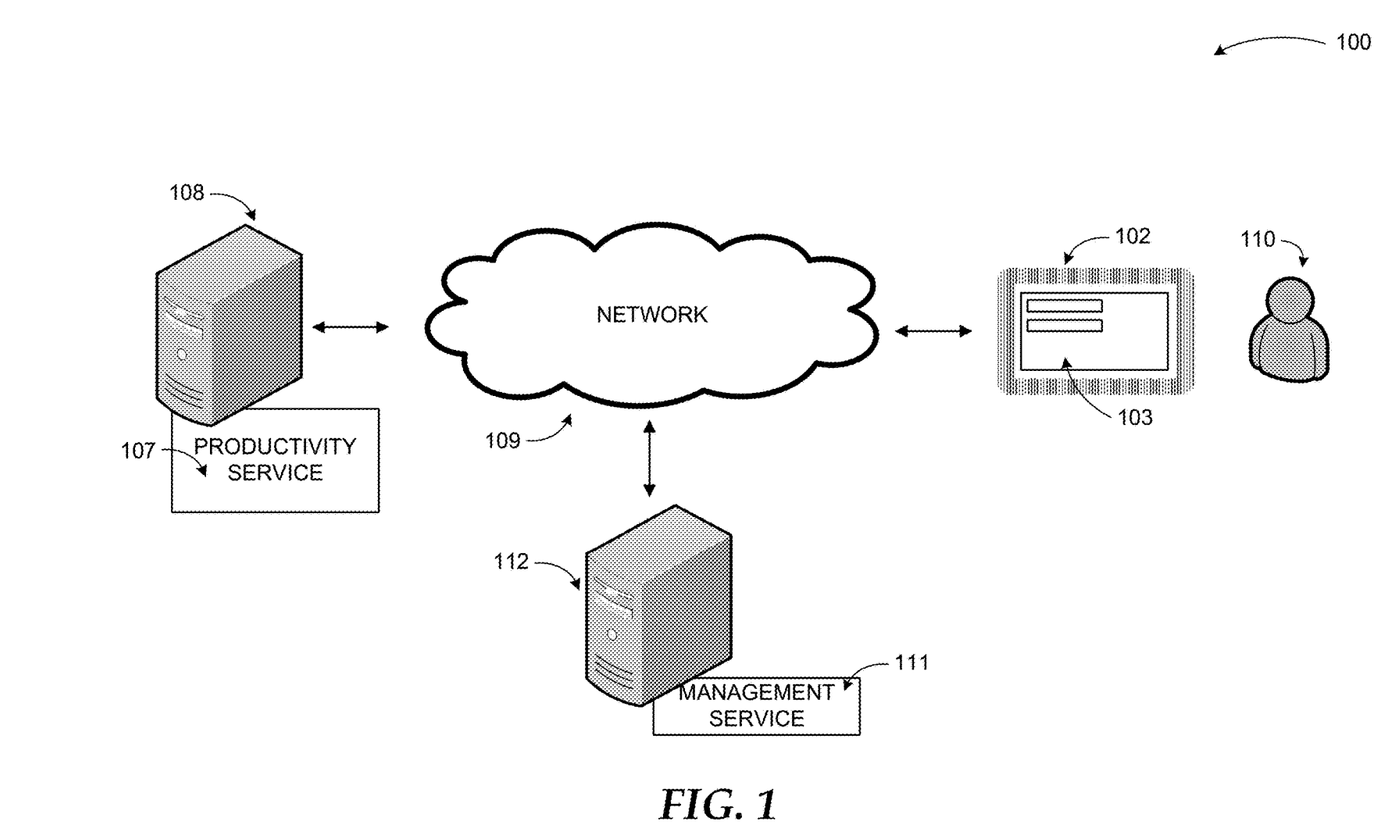
FIG. 1 is a conceptual diagram illustrating an example of provision digital asset management, according to embodiments.

FIG. 1 is a conceptual diagram illustrating an example of provisioning digital asset management, according to embodiments.

In a diagram 100, a computing device 112 may execute a management service 111. An example of the management service 111 may include an application that provides information and data processing functionality. The computing device 112 may include a hardware based server, a laptop computer, and a desktop computer, among others.

The computing device 112 may communicate with an external resource 108 and a client device 102 through a network 109. The external resource 108 may provide a productivity service 107. Examples of the productivity service 107 may include a communication service, a social networking service, a professional networking service, an application service, and a storage service, among others. The application service may provide applications for use and consumption by client devices.

The network 109 may include wired and wireless components that allow wired and wireless communication between nodes such as the external resource 108, the computing device 112, and the client device 102, among others. The client device 102 may display a client user interface (UI) 103 of the management service 111 to an asset manager 110. The client UI 103 may provide functionality to manage digital asset management actions. The digital asset management actions may be modified by the asset manager 110 to dispose of the digital assets of an asset owner in response to a trigger event. The trigger event may include an incapacitation of the asset owner. The incapacitation may include a death of the asset owner, and a permanent relocation of the asset owner, among other trigger events.

The asset manager 110 may be allowed to interact with the client UI 103 through an input device or touch enabled display component of the client device 102. The client device 102 may include a display device such as the touch enabled display component, and a monitor, among others. The display device may be used to provide the client UI 103 of the management service 111 to the asset manager 110.

The asset manager 110 may interact with the client UI 103 with a keyboard based input, a mouse based input, a voice based input, a pen based input, and a gesture based input, among others. The gesture based input may include one or more touch based actions such as a touch action, a swipe action, and a combination of each, among others.

The management service 111 may use credentials of an asset owner to retrieve digital assets of an asset owner from the productivity service 107. The credentials of the asset owner may be submitted to the productivity service 107 to access the digital assets of the asset owner. A search of the digital assets may be conducted at the productivity service 107. Identified digital assets may be retrieved from the productivity service 107. Digital assets such as pictures, documents, and accounts (such as account status information), among others may be retrieved.

While the example system in FIG. 1 has been described with specific components including the computing device 112, the managing service 111, embodiments are not limited to these components or system configurations and can be implemented with other system configuration employing fewer or additional components.

Figure 2:
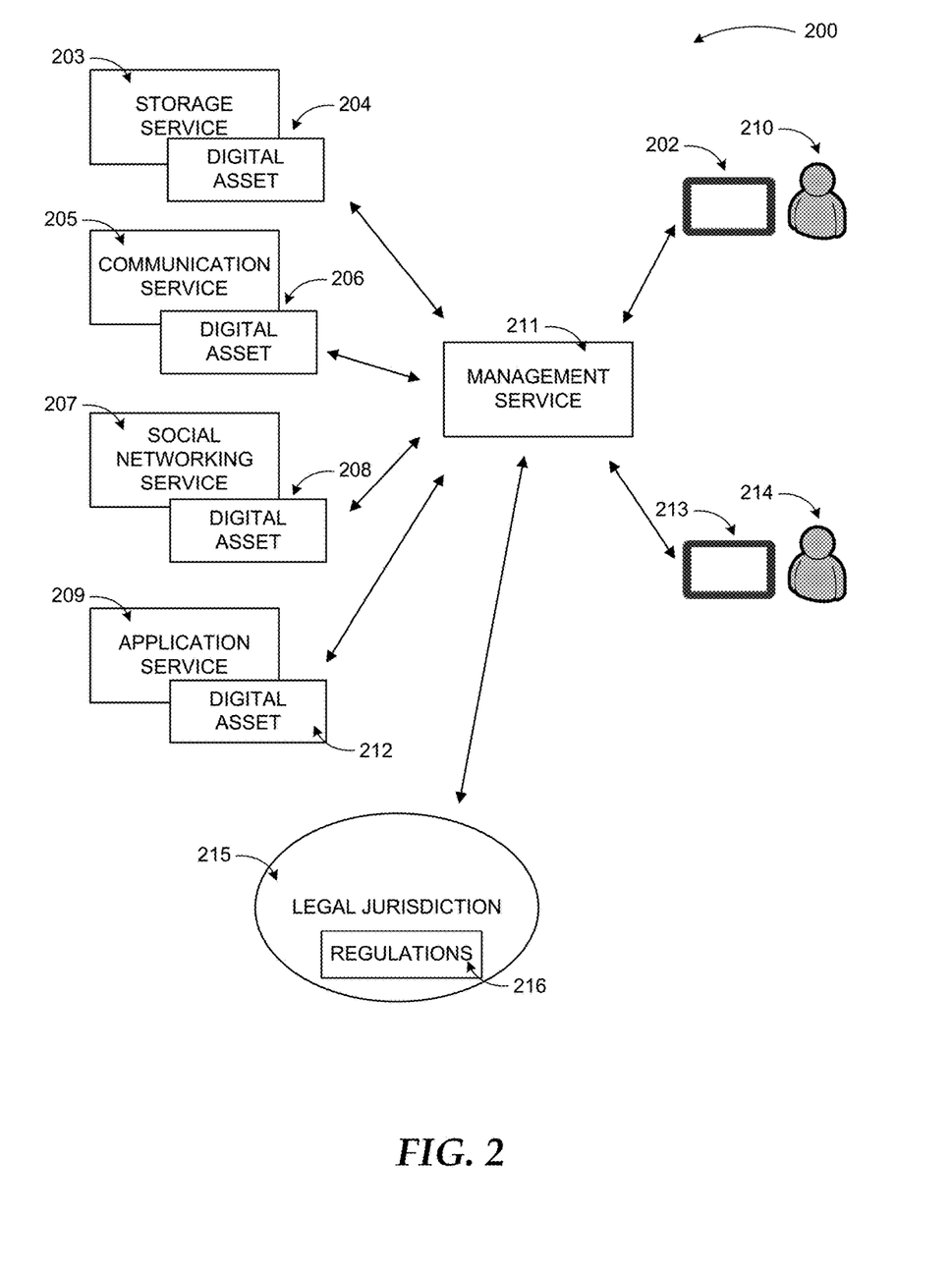
FIG. 2 illustrates an example of interactions between a management service and external resources to provision digital asset management, according to embodiments.

FIG. 2 illustrates an example of interactions between a management service and external resources to provision digital asset management, according to embodiments.

In a diagram 200, a management service 211 may interact with external resources and an asset manager 210, among others to generate digital asset management actions. The digital asset management actions may be used to dispose of the digital assets of an asset owner 214 in response to a trigger event such as an incapacitation of the asset owner 214.

The external resources may include a storage service 203, a communication service 205, a social networking service 207, and an application service 209. The storage service 203 may store a digital asset 204 such as a document of the asset owner 214. The communication service 205 may provide communication related functionality such as an email service, a teleconference service, and a messaging service, among others. The communication service 205 may store a digital asset 206 such as an email of the asset owner 214, among others.

The social networking service 207 may provide a digital asset 208 such as the social networking presence of the asset owner 214. The digital asset 208 may include status and information related to the asset owner such as location and time based information associated with the asset owner 214, and pictures of the asset owner 214, among others.

The application service 209 may provide a digital asset 212 such as an application used by the asset owner 214. The application may be a hosted application such as a web application that is executed remotely and displayed by a client UI on a computing device 213 of the asset owner 214. Alternatively, the application may be a local application that may be downloaded to the computing device 213 by the asset owner 214 for execution locally on the computing device 213.

In an example scenario, the asset owner 214 may access a client UI of the management service 211. The asset owner 214 may create an account in the management service 211 to control a disposition of the digital assets owned by the asset owner 214. The asset owner 214 may provide credentials to access the digital assets (204, 206, 208, 212) at the storage service 203, the communication service 205, the social networking service 207, and the application service 209, among others.

The asset owner 214 may also delegate management of the actions to dispose of the digital assets (204, 206, 208, and 212) to an asset manager 210. The asset manager 210 and the asset owner 214 may be the same person. Alternatively, the asset manager 210 may include a legal representative of the asset owner 214, an authorized family member of the asset owner 214, an authorized relation of the asset owner 214, and an authorized colleague of the asset owner 214, among others.

The management service 211 may retrieve the digital assets (204, 206, 208, and 212) from the associated services using the credentials provided by the asset owner 214. The asset manager 210 may also be authorized to have access to the credentials of the asset owner 214. The asset manager 210 may manage the retrieval of the digital assets (204, 206, 208, and 212) through a client UI of the management service 211 displayed on a computing device 202. The asset manager 210 may provide updated credentials to the management service 211 through the client UI displayed on the computing device 202 to allow the management service 211 to continue to monitor the digital assets (204, 206, 208, and 212). The management service 211 may also query the asset manager 210 to provide updated credentials in case of failure to access the digital assets (204, 206, 208, and 212)

The management service 211 may classify the digital assets (204, 206, 208, and 212) to asset categories such as a document type, and an account association, among others. The digital assets, the asset categories may be matched to suggested actions to dispose of the digital assets. The suggested actions may include operations such as an action to forward the digital assets (204, 206, 208, and 212) to a legal representative of the asset owner 214, an action to transmit credentials to the services associated with the digital assets (204, 206, 208, and 212) to the legal representative, an action to delete the digital assets (204, 206, 208, and 212) in the associated service, and an action to delete accounts associated with the digital assets (204, 206, 208, and 212), among others.

The suggested actions may also be further processed with regulations 216 retrieved from a legal jurisdiction 215 associated with the asset owner 214 or the assets (204, 206, 208, and 212). The legal jurisdiction 215 may provide rules to apply to the suggested actions such as retention time periods that prevent an action to delete digital assets that belong to types such as documents, among others.

The management service 211 may transmit the digital assets (204, 206, 208, and 212), the asset categories, the suggested actions, and suggested trigger events to the client UI to be displayed on the computing device 202 to the asset manager 210. The suggested trigger events may include an incapacitation of the asset owner 214. The incapacitation may include an inactivity by the asset owner 214 during a period of time, a death of the asset owner 214, a disablement of the asset owner 214, an expatriation of the asset owner 214, a permanent relocation of the asset owner 214, an imprisonment of the asset owner 214, and a legal incapacitation declaration associated with the asset owner 214, among others. The trigger event may be detected by monitoring the digital assets (204, 206, 208, and 212) for an information associated with the incapacitation. Alternatively, the asset manager 210 may initiate the trigger event manually through a client UI of the management service 211.

The asset manager 210 may customize the digital assets (204, 206, 208, and 212), the asset categories, the suggested actions, and the suggested trigger events. Customization may include selection of a subset of the digital assets (204, 206, 208, and 212) for disposition, reclassification of the digital assets (204, 206, 208, and 212) to other asset categories, modification of the suggested actions, and modification of the suggested trigger events, among others.

A workflow may be created from the digital assets (204, 206, 208, and 212), the asset categories, the suggested actions, and the suggested trigger events. The workflow may be updated based on changes to the digital assets (204, 206, 208, and 212). The workflow may also be updated by the asset manager 210 (or the asset owner 214 acting as the asset manager 210) to further customize the digital assets (204, 206, 208, and 212), the asset categories, the suggested actions, and the suggested trigger events.

Figure 3:
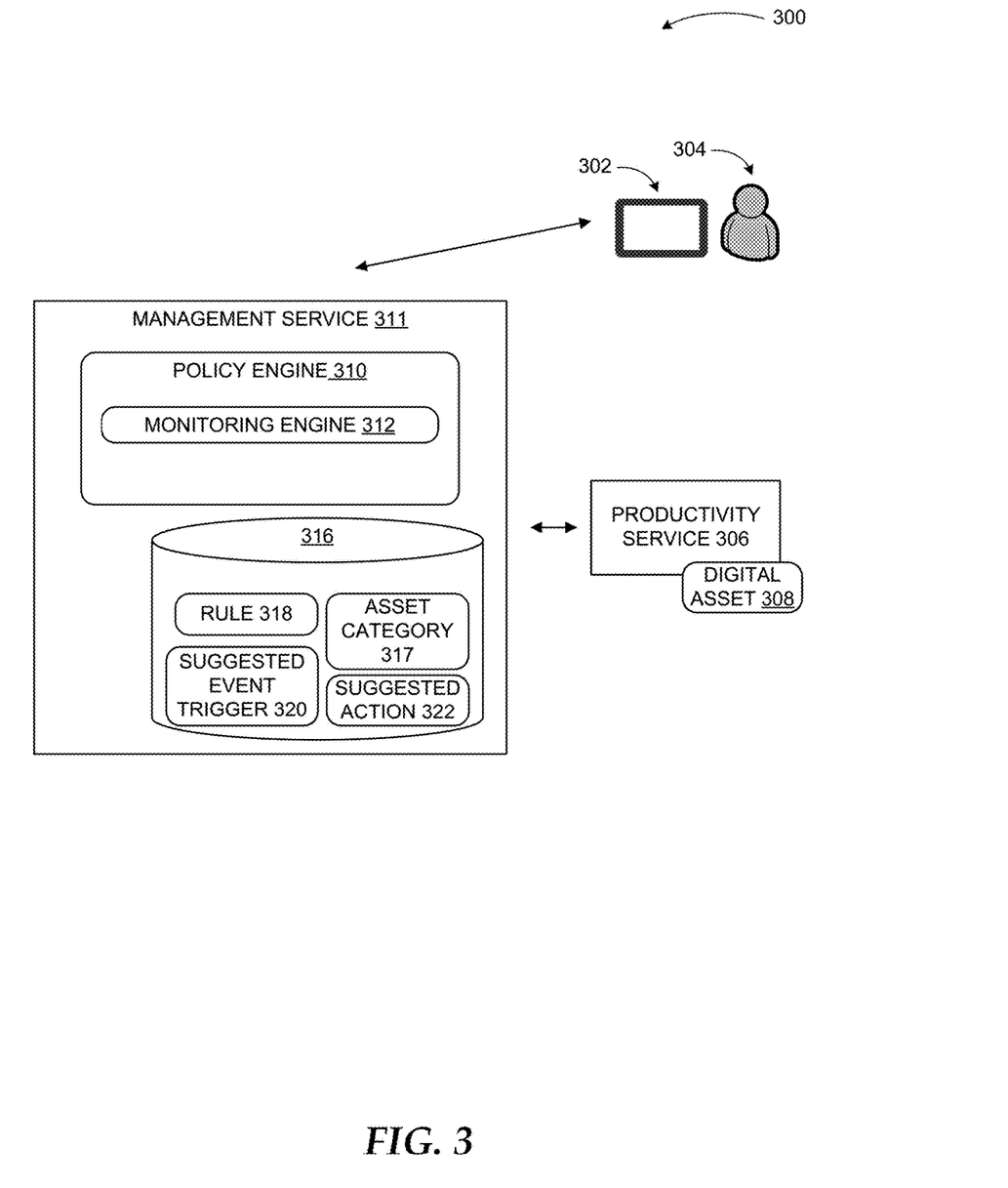
FIG. 3 illustrates a component diagram of a management service that provisions digital asset management, according to embodiments.

FIG. 3 illustrates a component diagram of a management service that provisions digital asset management, according to embodiments.

In a diagram 300, a management service 311 may provision digital asset management. An asset manager 304 may access a client UI of the management service 311 through a computing device 302. The asset manager 304 may provide the management service 311 with credentials to a productivity service 306. Using the credentials to gain access, the management service 311 may monitor a digital asset 308 hosted by the productivity service 306. A workflow to dispose of the digital asset 308 may be created by the management service 311.

The management service 311 may have a policy engine 310 that maintains a suggested action 322 to dispose of the digital asset 308. The policy engine 310 may include a rule 318 that describes an operation to dispose of the digital asset 308. The operation may include a forward operation to be applied to the digital asset 308 to transmit the digital asset 308 to a legal representative, a deletion operation to be applied to the digital asset 308 to delete the digital asset 308, among others.

The policy engine 310 may also process the digital asset 308 to classify the digital asset 308 into an asset category 317. An example of the asset category 317 may include a picture classification, a document classification, a music classification, a video classification, a purchased subscription classification, a social networking account association, and a professional networking account association, among others. Another example of the asset category 317 may include a time of creation, a location of creation, a creator of the digital asset 308, among others. Yet, another example of the asset category 317 may include a sharing relation associated with the digital asset 308. The sharing relation may include of a family member of the asset owner, a friend of the asset owner, a colleague of the asset owner, a group member associated with the asset owner.

A monitoring engine 312 may query the productivity service 306 to locate the digital asset 308 with credentials that may be provided by the asset manager 304. The asset manager 304 may include the asset owner, among other authorized relations of the asset owner. The monitoring engine 312 may provide the digital asset 308 to the policy engine 310 for processing to generate the suggested action 322. The suggested action 322 may be executed to dispose of the digital asset 308 in response to a detection of the suggested trigger event 320. A data store 316 may store a list of rules, categories, trigger events, and actions that include the rule 318, the asset category 317, the suggested trigger event 320, and the suggested action 322, which may be used to generate the workflow to dispose of the digital asset 308.

In an example scenario, the monitoring engine 312 may periodically query the productivity service 306 to detect changes to the digital asset 308. The digital asset 308 may also be monitored to detect information associated with the suggested trigger event 320. A death announcement of the asset owner within a content of the digital asset 308 may be identified as the suggested trigger event 320.

The monitoring engine 312 may be component of the policy engine 310. Alternatively, the monitoring engine 312 may be a stand-alone component of the management service 311.

Figure 4:
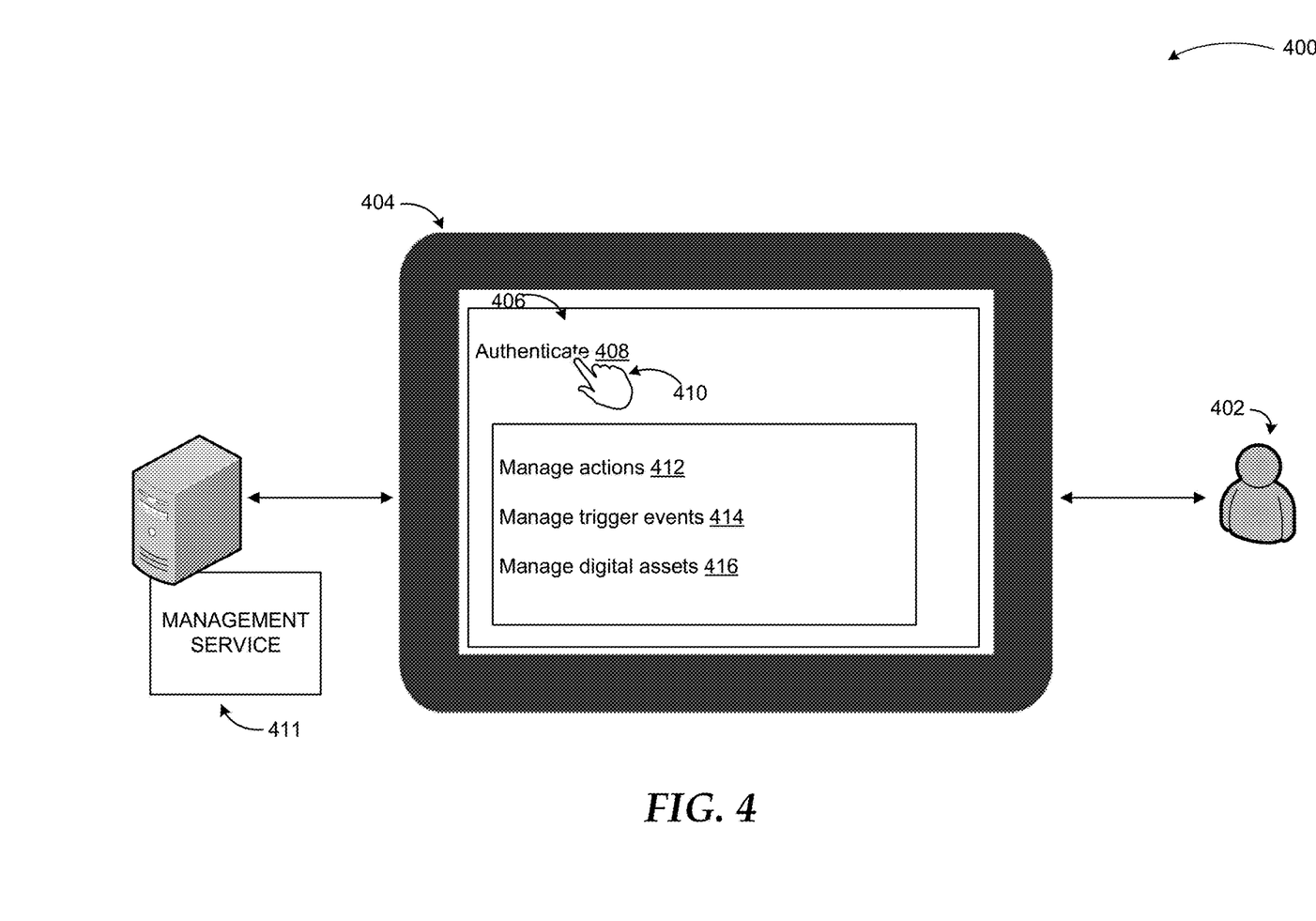
FIG. 4 illustrates an example of a user interface to provision digital asset management, according to embodiments.

FIG. 4 illustrates an example of a user interface to provision digital asset management, according to embodiments.

In a diagram 400, a management service 411 may provide a client UI 406 on a computing device 404 to allow an asset manager 402 to generate a workflow to dispose of a digital asset associated with an asset owner. The workflow may include components such as suggested actions that are processed based on the digital assets, asset categories associated with the digital assets, and suggested trigger events. The suggested actions, the asset categories, the digital assets, the suggested trigger events may be customized by the asset manager 402. The suggested actions may also be processed based on regulations of a legal jurisdiction associated with the asset owner or the digital assets to comply with the regulations.

The client UI 406 may display controls to modify components of the workflow. The asset manager 402 may activate the controls to execute operations associated with the controls. An "authenticate" control 408 may be activated by a gesture 410 to display authentication controls. The "authenticate" control 408 may capture credentials of the asset manager 402 to authorize the asset manager 402 to access an account associated with a disposition of digital assets of an asset owner. The "authenticate" control 408 may also capture credentials of the asset owner associated with an external resource that may host digital assets of the asset owner.

A "manage actions" control 412 (upon activation) may provide additional controls to select and modify suggested actions associated with identified digital assets. An example may include a list of suggested actions that match a digital asset such as a document. The list may include a delete action, a forward action, among others. The asset manager 402 may be provided with controls to select and modify suggested actions from the list.

A "manage trigger events" control 414 (upon activation) may provide additional controls to select and modify suggested trigger events. An example may include a list of suggested trigger events such as an incapacitation of the asset owner. The list may include a death of the asset owner, a disablement of the asset owner, an expatriation of the asset owner, a permanent relocation of the asset owner, an imprisonment of the asset owner, and a legal incapacitation declaration associated with the asset owner, among others. The asset manager 402 may be provided with controls to select and modify trigger events from the list.

A "manage digital assets" control 416 may provide the asset manager 402 with additional controls to modify a list of detected digital assets associated with the asset owner. The asset manager 402 may be provided with the additional controls to select a subset of the detected digital assets to monitor for disposition in case of a trigger event.

The digital assets may also be processed by the management service 411 to identify associated tangible assets. The tangible assets may include a bank account, a health record, and a legal document associated with the asset owner, among others. Additional suggested actions may be added to the workflow to dispose of the tangible assets. The additional suggested actions may also be processed to comply with regulations of a legal jurisdiction associated with the tangible assets or the asset owner. An example of the additional suggested actions may include transfer of the tangible assets to an executor of an estate of the asset owner.

According to embodiments described herein, the technical advantage of provisioning digital asset management may include improved usability of digital assets with optimized actions generated to manage digital assets of an asset owner after an incapacitation event. A workflow of digital asset management actions to dispose of the digital assets may address a need that arises from extensive digital personalities generated by asset owners in an extensive digital world. The workflow of digital asset management actions may streamline disposition of the digital assets following the incapacitation event compared to cumbersome legacy manual asset review solutions.

Embodiments address a need that arises from very large scale of operations created by networked computing and cloud based services that cannot be managed by humans. The actions/operations described herein are not a mere use of a computer, but address results of a system that is a direct consequence of software used as a service such as digital asset management services offered in conjunction with digital asset owner incapacitation.

The example scenarios and schemas in FIG. 1 through 4 are shown with specific components, data types, and configurations. Embodiments are not limited to systems according to these example configurations. Provisioning digital asset management may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
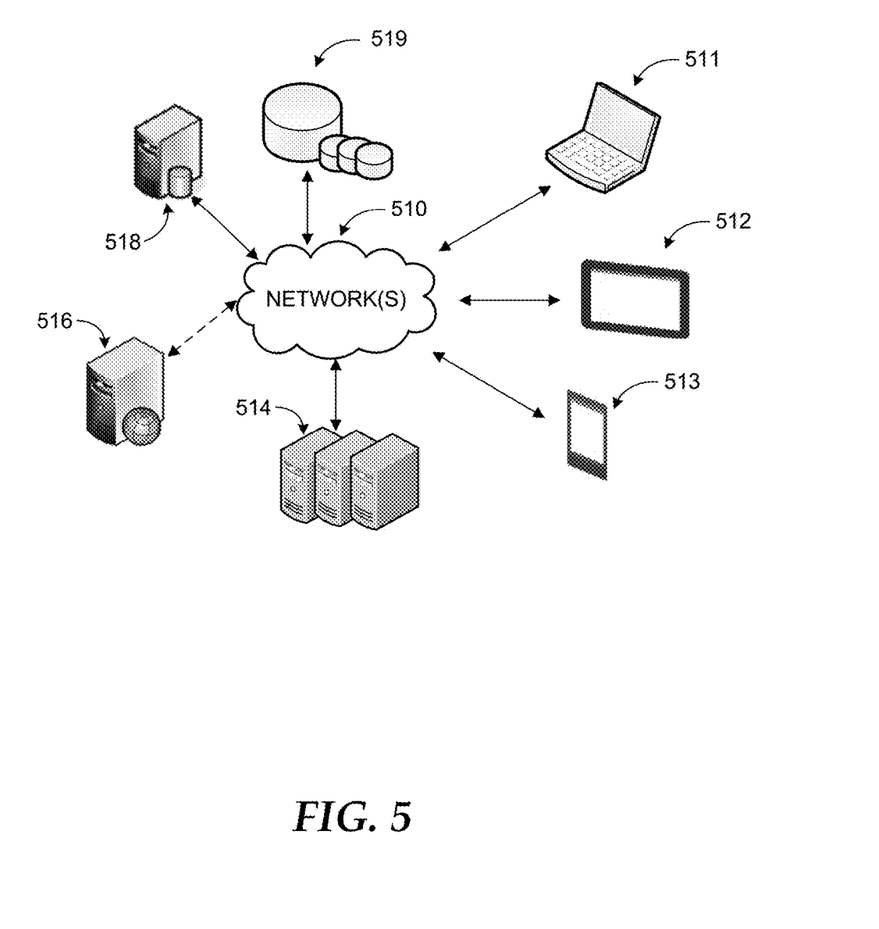
FIG. 5 is a simplified networked environment, where a system according to embodiments may be implemented.

FIG. 5 is an example networked environment, where embodiments may be implemented. A management service configured to provision digital asset management may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A management service may retrieve digital assets from external resources in response to a search of the external resources. The digital assets may be classified to asset categories, which may be used to match the digital assets to suggested actions to dispose of the digital assets in case of an incapacitation of the asset owner. The digital assets, the asset categories, the suggested trigger events, or the suggested actions may be transmitted to an asset manager to have the asset manager customize the digital assets, the asset categories, suggested trigger events, or the suggested actions. A workflow may be created from the digital assets, the asset categories, the suggested trigger events, and the suggested actions to dispose of the digital assets in case of the incapacitation of the asset owner. The management service may store data associated with digital asset in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provision digital asset management. Furthermore, the networked environments discussed in FIG. 5 are for illustration purposes only. Embodiments are not limited to the example applications, modules, or processes.

Figure 6:
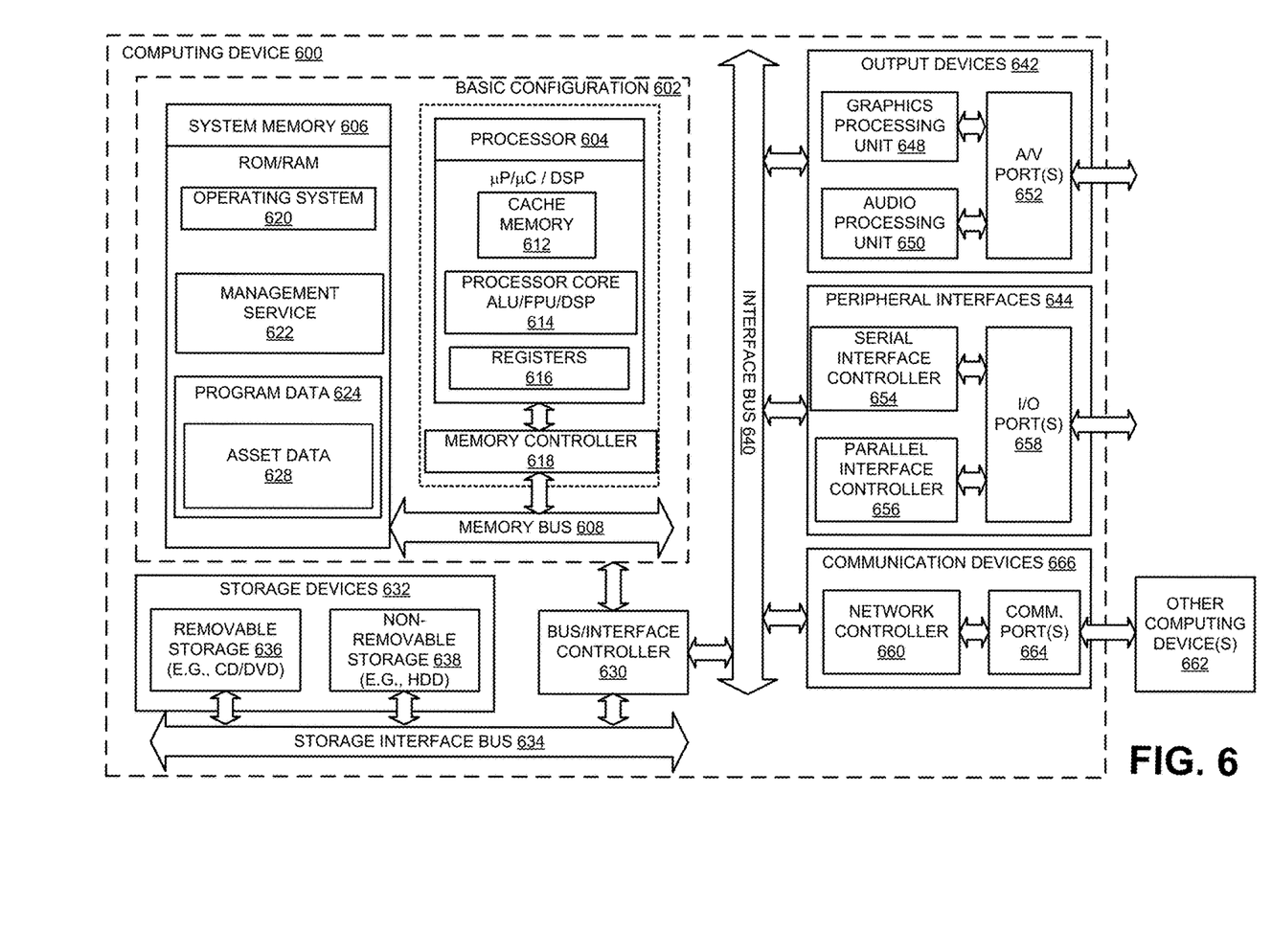
FIG. 6 illustrates a general purpose computing device, which may be configured to provision digital asset management, according to embodiments.

FIG. 6 illustrates a general purpose computing device, which may be configured to provision digital asset management, arranged in accordance with at least some embodiments described herein.

For example, the computing device 600 may be used to provision digital asset management. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (μP), a microcontroller (μC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a management service 622, and a program data 624. The management service 622 may retrieve digital assets from external resources in response to a search of the external resources. The digital assets may be classified to asset categories which may be used to match the digital assets to suggested actions to dispose of the digital assets in case of an incapacitation of the asset owner. The digital assets, the asset categories, suggested trigger events, or the suggested actions may be transmitted to an asset manager to prompt the asset manager customize the digital assets, the asset categories, suggested trigger events, or the suggested actions. A workflow may be created from the digital assets, the asset categories, the suggested trigger events, and the suggested actions to dispose of the digital assets in case of the incapacitation of the asset owner. Components of the management application 622 (such as a client user interface) may also be displayed on a display device. An example of the display device may include another computing device with a display component. The display device may include a touch based device that detects gestures such as a touch action. The display device may also provide feedback in response to detected gestures (or any other form of input) by transforming a client user interface of the management service 622, displayed by the touch based device. The program data 624 may also include, among other data, asset data 628, or the like, as described herein. The asset data 628 may include a digital asset, an asset category, a suggested action, a suggested trigger event, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provision digital asset management. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by preselected criteria that may be machine automated.

Figure 7:
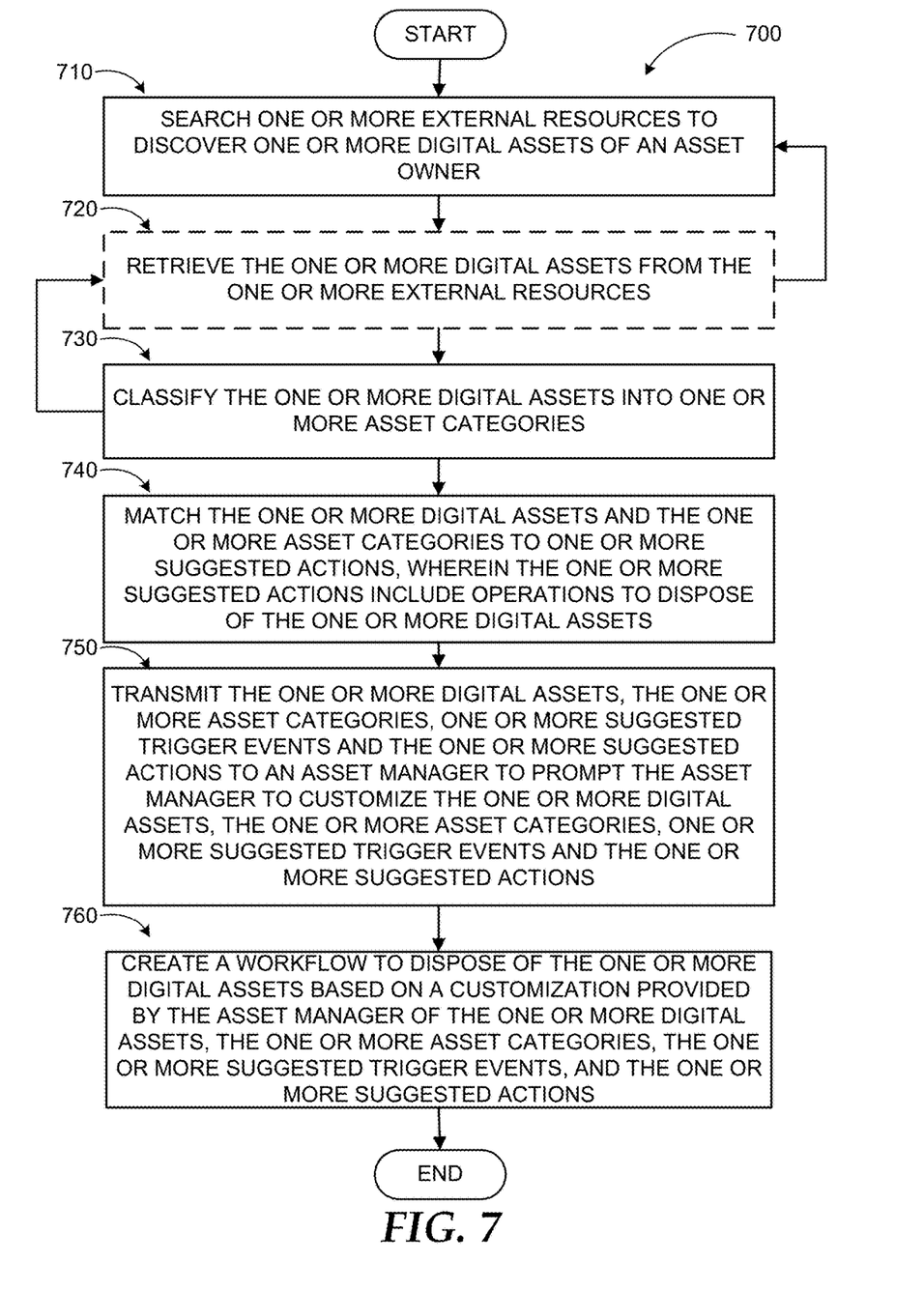
FIG. 7 illustrates a logic flow diagram for a process to provision digital asset management, according to embodiments.

FIG. 7 illustrates a logic flow diagram for a process to provision digital asset management, according to embodiments. Process 700 may be implemented on a management service.

Process 700 begins with operation 710, where external resources may be searched to discover digital assets of an asset owner. Credentials of the asset owner may be used to access the external resources. At operation 720, the digital assets may be retrieved from the external resources. The digital assets may be classified to asset categories at operation 730. The asset categories may include a document type, and an account association, among others.

At operation 740, the digital asset and the asset categories may be matched to suggested actions. The suggested action may include operation to dispose of the digital assets. The digital assets, the asset categories, the trigger events, or the suggested actions may be transmitted to an asset manager to prompt the asset manager to customize the digital assets, the asset categories, the trigger events, or the suggested actions at operation 750. At operation 760, a workflow may be created to dispose of the digital assets based on a customization provided by the asset manager of the digital assets, the asset categories, the suggested trigger events, the suggested actions. The customization may include a selection and a modification of a subset of the digital assets, the asset categories, the suggested trigger events, the suggested actions.

Some or all of the operations of the process 700 may be reprocessed with feedback operations. In an example scenario, the digital assets retrieved from the external resources with the operation 720 may be used to identify related digital assets. The related digital assets may be provided as input to execute an additional search for digital assets in the operation 710. In another example scenario, the asset categories of the digital assets classified in the operation 730 may be used to retrieve additional digital assets in the operation 720. The asset categories may be used to identify relationship with related assets. The related asset may be retrieved in the operation 720. Other feedback loops may be used with other operations of the process 700 to customize operations of the process 700, among other things.

The operations included in process 700 are for illustration purposes. A management service according to embodiments may be implemented by similar processes with fewer or additional steps, as well as in different order of operations using the principles described herein.

According to some examples, a computing device to provision digital asset management may be described. The computing device may include a memory configured to store instructions associated with a management service and one or more processors coupled to the memory. The one or more processors may execute the management service in conjunction with instructions stored in the memory. The management service may include a monitoring engine configured to search one or more external resources to automatically discover one or more digital assets associated with an asset owner. The management service may further include a policy engine configured to classify the one or more digital assets into one or more asset categories, match the one or more digital assets and the one or more asset categories to one or more suggested actions, where the one or more suggested actions include operations to dispose of the one or more digital assets in response to an incapacitation event associated with the asset owner, transmit the one or more digital assets, the one or more asset categories, one or more suggested trigger events and the one or more suggested actions to an asset manager to prompt the asset manager to customize the one or more digital assets, the one or more asset categories, one or more suggested trigger events and the one or more suggested actions, and create a workflow to dispose of the one or more digital assets based on a customization provided by the asset manager of the one or more digital assets, the one or more asset categories, the one or more suggested trigger events, and the one or more suggested actions.

According to other examples, the policy engine may be further configured to identify one or more of the asset owner, a legal representative of the asset owner, an authorized family member of the asset owner, an authorized relation of the asset owner, and an authorized colleague of the asset owner as the asset manager. The monitoring engine may be further configured to detect an input of one or more credentials associated with the one or more external resources from the asset owner and transmit the one or more credentials to the one or more external resources to access the one or more digital assets. The one or more external resources may include one or more of a storage service, a communication service, a social networking service, a professional networking service, and an application service.

According to further examples, the policy engine may be further configured to identify a classification attribute of the one or more digital assets and match the classification attribute to the one or more categories, where the one or more categories include one or more of a private classification, a work-related classification, a sensitive classification, and a secret classification. The policy engine may be further configured to identify a classification attribute of the one or more digital assets and match the classification attribute to the one or more categories, where the one or more categories include one or more of a picture classification, a document classification, a music classification, a video classification, a purchased subscription classification, a social networking account association, and a professional networking account association.

The policy engine may be further configured to identify the one or more asset categories based on one or more of a time of creation, a location of creation, a creator of the one or more digital assets. The policy engine may be further configured to identify the one or more asset categories based on a sharing relation associated with the one or more digital assets, where the sharing relation includes one or more of a family member of the asset owner, a friend of the asset owner, a colleague of the asset owner, a group member associated with the asset owner. An inactivity within a time period may be identified by the asset owner as the one or more trigger events. The policy engine may be further configured to analyze the one or more digital assets to identify the incapacitation event associated with the asset owner as the one or more trigger events and detect the incapacitation event in conjunction with the one or more digital assets. One or more of a death of the asset owner, a disablement of the asset owner, an expatriation of the asset owner, a permanent relocation of the asset owner, an imprisonment of the asset owner, a legal incapacitation declaration associated with the asset owner may be identified as the incapacitation event.

According to some examples, a method executed on a computing device to provision digital asset management may be described. The method may include searching one or more external resources to discover automatically one or more digital assets of an asset owner, classifying the one or more digital assets into one or more asset categories, matching the one or more digital assets and the one or more asset categories to one or more suggested actions, where the one or more suggested actions include one or more operations to dispose of the one or more digital assets in response to an incapacitation event associated with the asset owner, transmitting the one or more digital assets, the one or more asset categories, one or more suggested trigger events and the one or more suggested actions to an asset manager to prompt the asset manager to customize the one or more digital assets, the one or more asset categories, one or more suggested trigger events and the one or more suggested actions, where the asset manager includes one or more of the asset owner, a legal representative of the asset owner, an authorized family member of the asset owner, an authorized relation of the asset owner, and an authorized colleague of the asset owner, and creating a workflow to dispose of the one or more digital assets based on a customization provided by the asset manager of the one or more digital assets, the one or more asset categories, the one or more suggested trigger events, and the one or more suggested actions.

According to other examples, the method may further include accessing a legal resource to retrieve regulations of a jurisdiction associated with the asset owner and processing the one or more suggested actions to comply with the regulations. The method may further include accessing a legal resource to retrieve regulations of a jurisdiction associated with the one or more digital assets and processing the one or more suggested actions to comply with the regulations. The method may further include identifying one or more tangible assets associated with the asset owner, where the one or more tangible assets include one or more of a bank account, a health record, and a legal document associated with the asset owner and providing one or more suggested actions to dispose of the one or more tangible assets. The method may further include accessing a legal resource to retrieve regulations of a jurisdiction associated with the asset owner and the one or more digital assets and modifying the one or more suggested actions in response to a change in the regulations. The one or more suggested actions to dispose of the one or more tangible assets may include a transfer of the one or more tangible assets to an executor of an estate of the asset owner.

According to some examples, a computer-readable memory device with instructions stored thereon to provision digital asset management may be described. The instructions may include actions that are similar to the method described above.

According to some examples, a means to provision digital asset management may be described. The means to provision digital asset management may include a means to search one or more external resources to automatically discover one or more digital assets associated with an asset owner, a means to classify the one or more digital assets into one or more asset categories, a means to match the one or more digital assets and the one or more asset categories to one or more suggested actions, where the one or more suggested actions include operations to dispose of the one or more digital assets in response to an incapacitation event associated with the asset owner, a means to transmit the one or more digital assets, the one or more asset categories, one or more suggested trigger events and the one or more suggested actions to an asset manager to prompt the asset manager to customize the one or more digital assets, the one or more asset categories, one or more suggested trigger events and the one or more suggested actions, and a means to create a workflow to dispose of the one or more digital assets based on a customization provided by the asset manager of the one or more digital assets, the one or more asset categories, the one or more suggested trigger events, and the one or more suggested actions.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provision digital asset management, the computing device comprising:
    a memory configured to store instructions associated with a management service;
    one or more processors coupled to the memory, the one or more processors executing the management service in conjunction with instructions stored in the memory, wherein the one or more processors are configured to:
        search an external resource to automatically discover a digital asset associated with an asset owner;
        classify the digital asset into an asset category;
        match the digital asset and the asset category to an action, wherein the action includes an operation to dispose of the digital asset in response to an incapacitation event associated with the asset owner;
        transmit a list of the digital asset, the asset category, and the action to an asset manager as a suggestion to prompt a customization of the digital asset, the asset category, and the action by the asset manager;
        provide suggested trigger events that indicate an occurrence of the incapacitation event associated with the asset owner within the list for one or more of selection and modification by the asset manager;
        create a workflow to dispose of the digital asset based on the customization provided by the asset manager and a subset of the suggested trigger events selected and modified by the asset manager, wherein the workflow provides for execution of the action to dispose of the digital asset in response to a detection of one or more of the subset of the suggested trigger events; and
        in response to detecting information associated with the one or more of the subset of the suggested trigger events, automatically execute the action in accordance with the workflow to dispose of the digital asset.

2. The computing device of claim 1, wherein the one or more processors are further configured to:
    identify one or more of the asset owner, a legal representative of the asset owner, an authorized family member of the asset owner, an authorized relation of the asset owner, and an authorized colleague of the asset owner as the asset manager.

3. The computing device of claim 1, wherein the one or more processors are further configured to:
    detect an input of a credential associated with the external resource from the asset owner; and
    transmit the credential to the external resource to access the digital asset.

4. The computing device of claim 1, wherein the external resource includes one or more of a storage service, a communication service, a social networking service, a professional networking service, and an application service.

5. The computing device of claim 1, wherein the one or more processors are further configured to:
    identify a classification attribute of the digital asset; and
    match the classification attribute to the asset category, wherein the asset category includes one or more of a private classification, a work-related classification, a sensitive classification, and a secret classification.

6. The computing device of claim 1, wherein the one or more processors are further configured to:
    identify a classification attribute of the digital asset; and
    match the classification attribute to the asset category, wherein the asset category includes one or more of a picture classification, a document classification, a music classification, a video classification, a purchased subscription classification, a social networking account association, and a professional networking account association.

7. The computing device of claim 1, wherein the one or more processors are further configured to:
    identify the asset category based on one or more of a time of creation, a location of creation, and a creator of the digital asset.

8. The computing device of claim 1, wherein the one or more processors are further configured to:
    identify the asset category based on a sharing relation associated with the digital asset, wherein the sharing relation includes one or more of a family member of the asset owner, a friend of the asset owner, a colleague of the asset owner, and a group member associated with the asset owner.

9. The computing device of claim 1, wherein the one or more processors are further configured to:
    identify an inactivity within a time period by the asset owner as one of the one or more of the subset of the suggested trigger events.

10. The computing device of claim 1, wherein the one or more processors are further configured to:
    analyze the digital asset to identify the incapacitation event associated with the asset owner as the one of the one or more of the subset of the suggested trigger events; and
    detect the incapacitation event in conjunction with the digital asset.

11. The computing device of claim 10, wherein the one or more processors are further configured to:
    identify one or more of a death of the asset owner, a disablement of the asset owner, an expatriation of the asset owner, a permanent relocation of the asset owner, an imprisonment of the asset owner, and a legal incapacitation declaration associated with the asset owner as the incapacitation event.

12. A method executed on a computing device to provision digital asset management, the method comprising:
    searching an external resource to discover automatically a digital asset of an asset owner;
    classifying the digital asset into an asset category;
    matching the digital asset and the asset category to an action, wherein the action includes an operation to dispose of the digital asset in response to an incapacitation event associated with the asset owner;
    transmitting a list of the digital asset, the asset category, and the action to an asset manager as a suggestion to prompt a customization of the digital asset, the asset category, and the action by the asset manager;

providing suggested trigger events that indicate an occurrence of the incapacitation event associated with the asset owner within the list for one or of selection and modification by the asset manager;

creating a workflow to dispose of the digital asset based on the customization provided by the asset manager and a subset of the suggested trigger events selected and modified by the asset manager, wherein the workflow provides for execution of the action to dispose of the digital asset in response to a detection of one or more of the subset of the suggested trigger events; and in response to detecting information associated with the one or more of the subset of the suggested trigger events, automatically executing the action in accordance with the workflow to dispose of the digital asset.

13. The method of claim 12, further comprising:
accessing a legal resource to retrieve regulations of a jurisdiction associated with the asset owner; and
processing the action to comply with the regulations.

14. The method of claim 12, further comprising:
accessing a legal resource to retrieve regulations of a jurisdiction associated with the digital asset; and
processing the action to comply with the regulations.

15. The method of claim 12, further comprising:
identifying a tangible asset associated with the asset owner, wherein the tangible asset includes one or more of a bank account, a health record, and a legal document associated with the asset owner; and
providing an additional action to dispose of the tangible asset.

16. The method of claim 12, further comprising:
accessing a legal resource to retrieve regulations of a jurisdiction associated with the asset owner and the digital asset; and
modifying the action in response to a change in the regulations.

17. The method of claim 15, wherein the action to dispose of the tangible asset include a transfer of the tangible asset to an executor of an estate of the asset owner.

18. A computer-readable memory device with instructions stored thereon to provision digital asset management, the instructions comprising:
searching an external resource to discover automatically a digital asset of an asset owner;
classifying the digital asset into an asset category;
matching the digital asset and the asset category to an action, wherein the action includes an operation to dispose of the digital asset in response to an incapacitation event associated with the asset owner;
transmitting a list of the digital asset, the asset category, and the action to an asset manager as a suggestion to prompt a customization of the digital asset, the asset category, and the action by the asset manager;
providing suggested trigger events that indicate an occurrence of the incapacitation event associated with the asset owner within the list for one or more of selection and modification by the asset manager;
creating a workflow to dispose of the digital asset based on the customization provided by the asset manager and a subset of the suggested trigger events selected and modified by the asset manager, wherein the workflow provides for execution of the action to dispose of the digital asset in response to a detection of one or more of the subset of the suggested trigger events; and
in response to detecting information associated with the one or more of the subset of the suggested trigger events, automatically executing the action in accordance with the workflow to dispose of the digital asset.

19. The computer-readable memory device of claim 18, wherein the instructions further comprise:
analyzing the digital asset to identify the incapacitation event associated with the asset owner as the one of the one or more of the subset of the suggested trigger events; and
identifying one or more of a death of the asset owner, disablement of the asset owner, an expatriation of the asset owner, a permanent relocation of the asset owner, an imprisonment of the asset owner, a legal incapacitation declaration associated with the asset owner as the incapacitation event.

20. The computer-readable memory device of claim 18, wherein the instructions further comprise:
identifying a tangible asset associated with the digital asset, wherein the tangible asset includes one or more of a bank account, a health record, and a legal document associated with the asset owner; and
provide an additional action to dispose of the tangible asset, wherein the additional action includes a transfer of the tangible asset to an executor of an estate of the asset owner.

* * * * *